(12) United States Patent
Poskie et al.

(10) Patent No.: US 8,202,195 B2
(45) Date of Patent: Jun. 19, 2012

(54) PINION GEAR SUBASSEMBLY AND METHOD OF ASSEMBLING A PLANET CARRIER ASSEMBLY

(75) Inventors: Fredrick R. Poskie, Plymouth, MI (US); Boris Burgman, Oak Park, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 310 days.

(21) Appl. No.: 12/436,200

(22) Filed: May 6, 2009

(65) Prior Publication Data

US 2010/0285919 A1 Nov. 11, 2010

(51) Int. Cl.
*F16H 57/08* (2006.01)

(52) U.S. Cl. .................... 475/331; 475/334; 475/346

(58) Field of Classification Search .................. 475/331, 475/334, 346, 347; 384/420, 310; 74/52
See application file for complete search history.

(56) References Cited

U.S. PATENT DOCUMENTS

| | | | |
|---|---|---|---|
| 5,382,203 A * | 1/1995 | Bellman et al. | 475/331 |
| 5,470,286 A * | 11/1995 | Fan | 475/331 |
| 5,928,105 A * | 7/1999 | Taha et al. | 475/331 |
| 6,106,429 A * | 8/2000 | Mortensen | 475/331 |
| 6,344,009 B1 * | 2/2002 | Wirz | 475/185 |
| 6,866,607 B2 * | 3/2005 | Nishiji et al. | 475/331 |
| 6,918,853 B2 * | 7/2005 | Tanikawa | 475/348 |
| 7,189,183 B2 * | 3/2007 | Fugel et al. | 475/331 |
| 2004/0082432 A1 * | 4/2004 | Suzumura et al. | 475/331 |
| 2006/0154778 A1 * | 7/2006 | Sowul et al. | 475/331 |

* cited by examiner

*Primary Examiner* — David D Le
*Assistant Examiner* — Jude Agendia
(74) *Attorney, Agent, or Firm* — Quinn Law Group, PLLC

(57) ABSTRACT

The pinion gear assembly thus includes a first and a second pinion gear arranged with generally parallel axes of rotation. A first and a second washer, referred to herein as stationary washers, are provided. Each of the washers has two openings spaced to generally align with two predetermined, spaced mounting locations on the planet carrier member. The first and the second washers are positioned on opposing sides of the first and second pinion gears, with the axes of rotation of the first and second pinion gears generally centered at the respective spaced openings of the washers. Because the stationary washer spans the two pinion gears, which are secured to the carrier member, the stationary member is operatively connected at two locations to the carrier member, eliminating the need for anti-rotation features and corresponding carrier features.

12 Claims, 4 Drawing Sheets

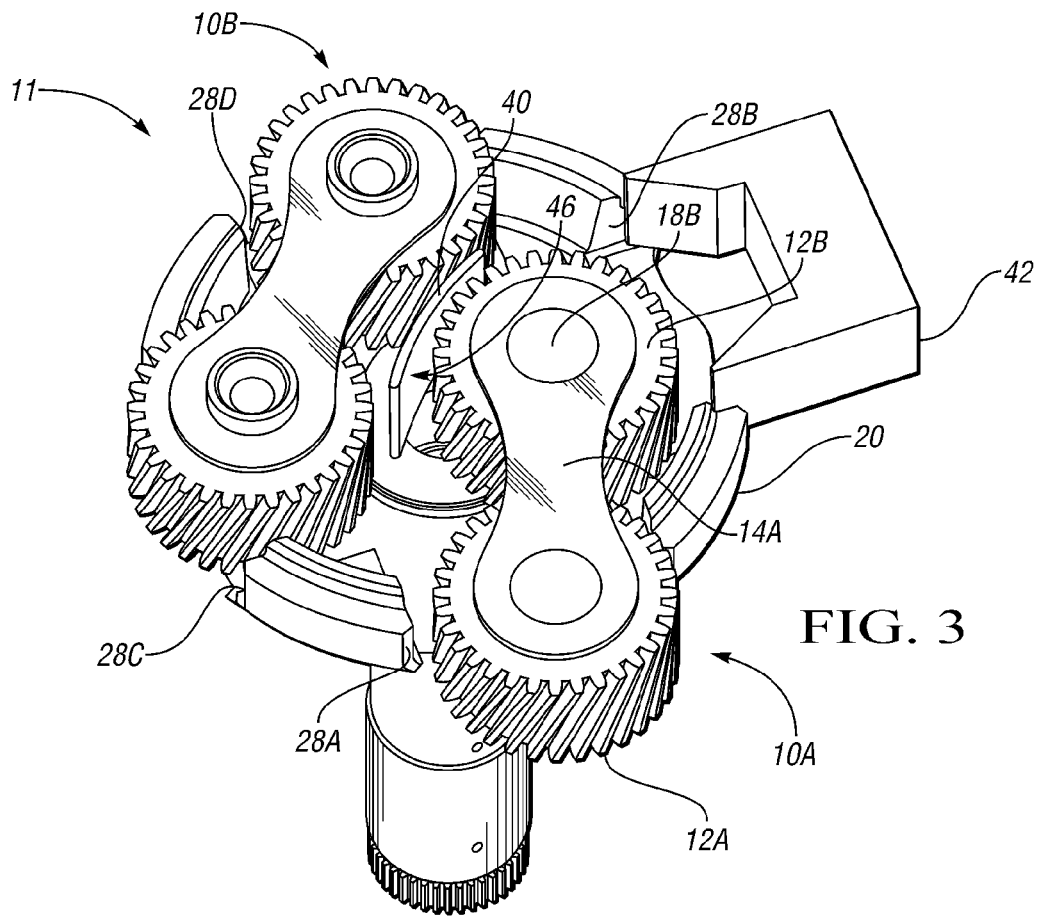
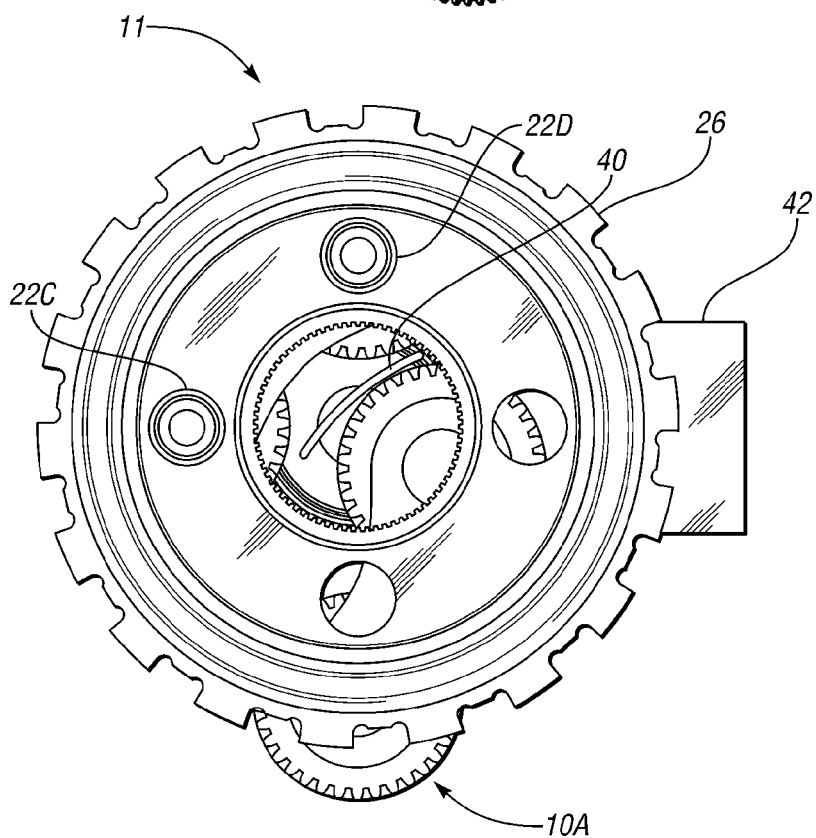

US 8,202,195 B2

PINION GEAR SUBASSEMBLY AND METHOD OF ASSEMBLING A PLANET CARRIER ASSEMBLY

TECHNICAL FIELD

The invention relates to a pinion gear subassembly for a planet carrier assembly and a method of assembling a planet carrier assembly.

BACKGROUND OF THE INVENTION

Planet carrier assemblies are an integral portion of planetary gear sets used in automatic transmissions on motor vehicles. Planet carrier assemblies include a cage-like carrier member with pinion gears rotatably mounted thereon. In a simple planet carrier assembly, the pinion gears mesh with both a ring gear member and a sun gear member. The carrier member may be rotatable, or may be grounded to a stationary (non-rotatable) member, such as the transmission casing. In either case, the pinion gears rotate relative to the carrier member. Accordingly, washers are used between the components. Typically, each pinion gear has a rotating washer placed adjacent either side. Stationary washers are placed between each of the rotating washers and the carrier member. The stationary washers are referred to as such as they are held stationary with respect to the carrier member by anti-rotation tabs, such as may be formed by secondary stamping operations. The carrier member is forged or machined with mating features to retain the tabs. Precise orientation is required to assemble the stationary washers to the carrier member by aligning the tabs with the mating feature. The anti-rotation tabs and mating features adds manufacturing expense and assembly time. Additionally, the anti-rotation tabs typically cause an increase in the outer diameter of the carrier assembly, requiring additional packaging space in the transmission.

Thus, a typical pinion gear has four dedicated washers (two rotating and two stationary). The pinion gears with dedicated washers are preassembled in a subassembly, which is then inserted into the carrier member and secured thereto. Each pinion gear subassembly is inserted separately into the carrier member.

SUMMARY OF THE INVENTION

A pinion gear subassembly for a planet carrier assembly with a planet carrier member is provided that enables a reduction of components, and eliminates manufacturing and assembly steps. Specifically, double-holed stationary washers span two adjacent pinion gears, with one stationary washer per side of the gears, and are secured to the carrier member at each of the holes, eliminating the need for two separate stationary washers for each pinion gear. The pinion gear assembly thus includes a first and a second pinion gear arranged with generally parallel axes of rotation. A first and a second washer, referred to herein as stationary washers, are provided. Each of the washers has two openings spaced to generally align with two predetermined, spaced mounting locations on the planet carrier member. The first and the second washers are positioned on opposing sides of the first and second pinion gears, with the axes of rotation of the first and second pinion gears generally centered at the respective spaced openings of the washers. Because the stationary washer spans the two pinion gears, which are secured to the carrier member, the stationary member is operatively connected at two locations to the carrier member, eliminating the need for anti-rotation features and corresponding carrier features.

The reduced part count pinion gear subassembly allows a method of assembling a planetary carrier assembly that includes inserting a pair of pinion gears through a circumferential opening in a planet carrier member, with the pair of pinion gears being connected via the stationary washers so that the pair of pinion gears with washers are inserted together. The method of assembly may be carried out using tooling components such as a guide member inserted in the carrier member and a stop held at one of the circumferential openings of the carrier member. The pinion gear subassembly is pushed off of the guide member (i.e., contacts and is redirected by the carrier member) towards the stop during the insertion, and then contacts the stop to reach a final position at which it may be secured to the carrier member.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic perspective view of the planet carrier assembly of FIG. 2, with the park gear removed for clarity, and with one pinion gear subassembly secured to the carrier member and the pinion gear subassembly of FIG. 2 partially inserted into the carrier member using a guide member and a stop;

FIG. 4 is a top view of the carrier assembly of FIG. 2, with the pinion gear subassembly partially inserted therein;

DESCRIPTION OF THE PREFERRED EMBODIMENTS

Figure 1:
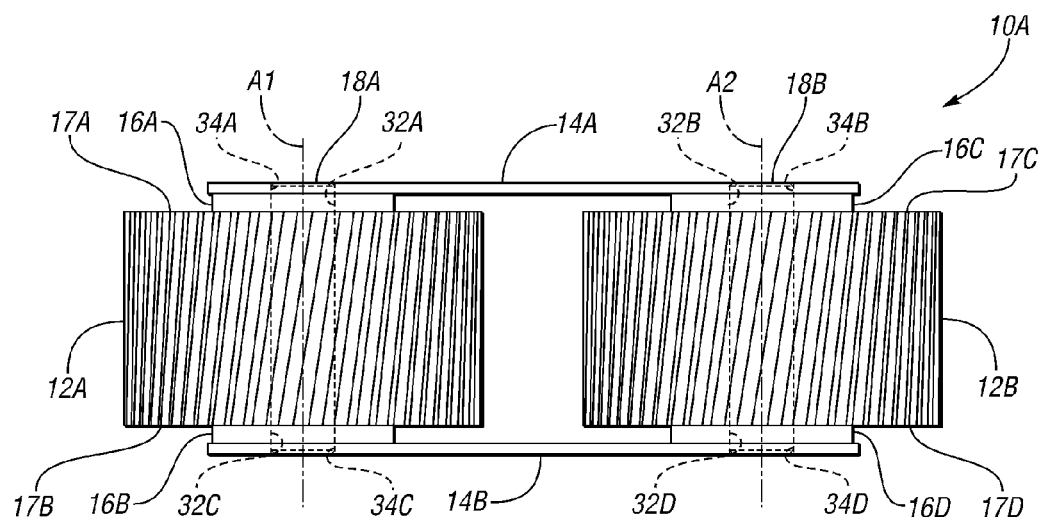
FIG. 1 is a schematic side view of a pinion gear subassembly.

Referring to the drawings, wherein like reference numbers refer to like components throughout the several views, FIG. 1 shows a pinion gear subassembly 10A. The pinion gear subassembly 10A includes two pinion gears 12A and 12B connected together by two double-holed stationary washers 14A, 14B, with four separate rotating washers 16A, 16B, 16C and 16D sandwiched between the stationary washers and respective sides 17A, 17B, 17C and 17D of the pinion gears 12A, 12B. Temporary plugs or pins 18A, 18B are inserted through aligned openings in the stationary washers 14A, 14B, the rotating washers 16A, 16B, 16C and 16D, and the pinion gears 12A, 12B to hold the subassembly 10A together until it is secured to the carrier member 20. The pinion gears 12A, 12B have axes of rotation A1, A2, respectively, that are generally parallel with one another when assembled in the pinion gear assembly 10A. The stationary washers 14A, 14B and rotating washers 16A, 16B, 16C and 16D are referred to as stationary and rotating, respectively, because of their ability or inability to rotate relative to a planet carrier member 20, also referred to as a planet spider, shown in FIG. 2, once inserted into and secured thereto with pins 22A, 22B.

Figure 2:
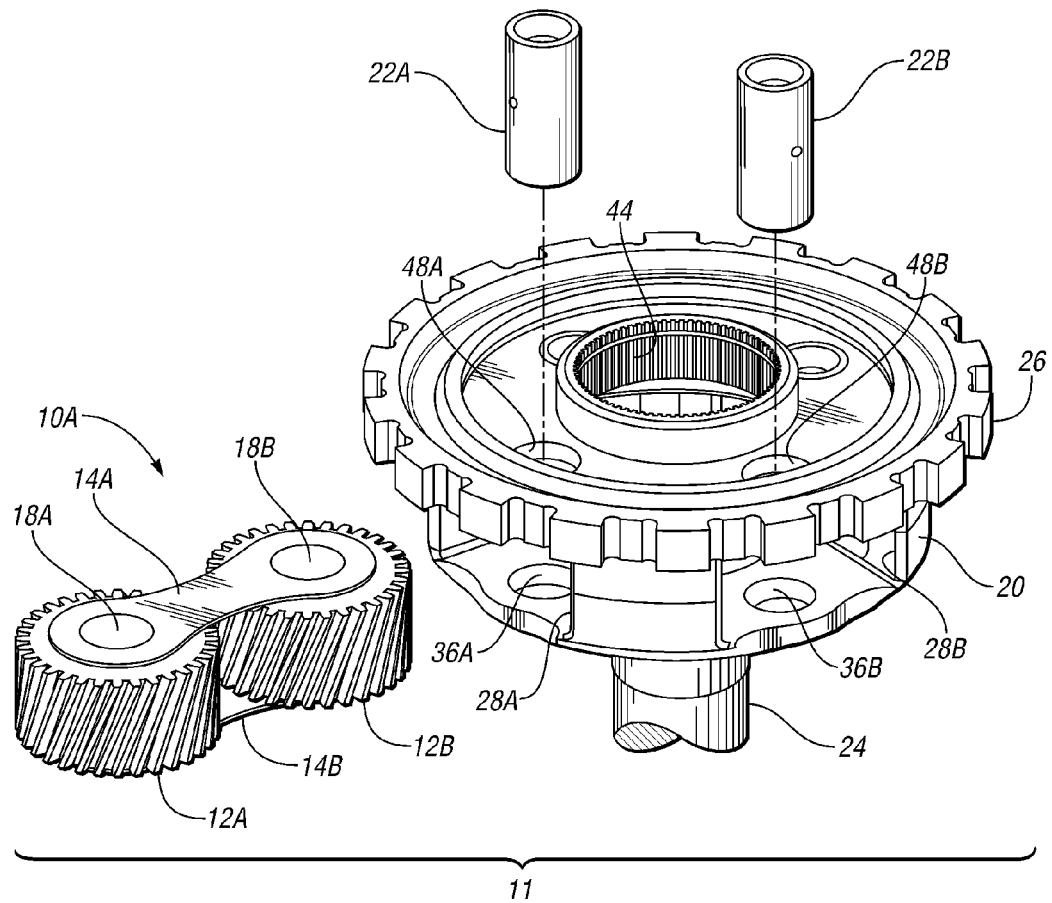
FIG. 2 is a schematic exploded perspective view of a planet carrier assembly connected with a park gear and an output member, with the pinion gear subassembly of FIG. 1 aligned for insertion into a carrier member.

Referring to FIG. 2, a planet carrier assembly 11 includes the subassembly 10A, the pins 22A, 22B, a like subassembly 10B (best shown in FIGS. 3 and 5), and the planet carrier member 20. In FIG. 2, the planet carrier member 20 is shown connected for rotation with an output shaft 24 and a park gear 26, such as for use on a vehicle transmission. The planet carrier member 20 has circumferentially-spaced openings 28A, 28B, 28C and 28D (see FIG. 3) sized to permit the pinion gear subassembly 10A to be inserted therethrough into the center of the carrier member 20, with gear teeth 30 of each of the pinion gears 12A, 12B and of pinion gears 12C, 12D on a substantially identical pinion gear subassembly 10B, extending out of the openings 28A-28D as best shown in FIGS. 3 and 4.

The rotating washers 16A, 16B, 16C and 16D are flat annular discs, without flanges or other orientation features other than the respective central openings 32A, 32B, 32C and 32D therethrough. The stationary washers 14A, 14B have no orientation features to orient them with respect to the carrier member 20, other than by aligning the respective openings 34A, 34B, 34C and 34D of the stationary washers 14A, 14B with predetermined locations, i.e., pin openings, of the carrier member 20 (two pin openings 36A, 36B shown in FIG. 2 spaced near the circumferential openings 28A, 28B, with like, equally-spaced pin openings (not shown, hidden by pinion gear assembly 10B), also corresponding with the circumferential openings 28C, 28D).

Referring to FIG. 3, a guide member 40 and stop 42 are used to help orient the pinion gear subassembly 10A to the correct position with respect to the carrier member 20 during insertion of the pinion gear subassembly 10A into the carrier member 20. Specifically, the guide member 40 is lowered on a rod (not shown) through a central opening 44 of the park gear 26 (see FIG. 2) to rest against an inner surface of the carrier member 20, as shown in FIG. 3. The stop 42 is moved via a rod (not shown) to a position against the carrier member 20 in which the stop 42 spans the opening 28B. Positioning of the guide member 40 and the stop 42 may be automated. The subassembly 10A is inserted with the pinion gear 12B forward-most or leading through the circumferential opening 28A. A robotic arm may be used to insert the subassembly 10A, or it may be inserted manually. The prepositioned guide member 40 has a curved contact surface 46 that will interfere with the forward-most pinion gear 12B and redirect the pinion gear 12B toward the opening 28B as the pinion gear subassembly 10A is pushed further into the carrier member 20. The interference will allow the pinion gear 12B to rotate about the plug 18B during insertion, promoting ease of assembly.

Figure 5:
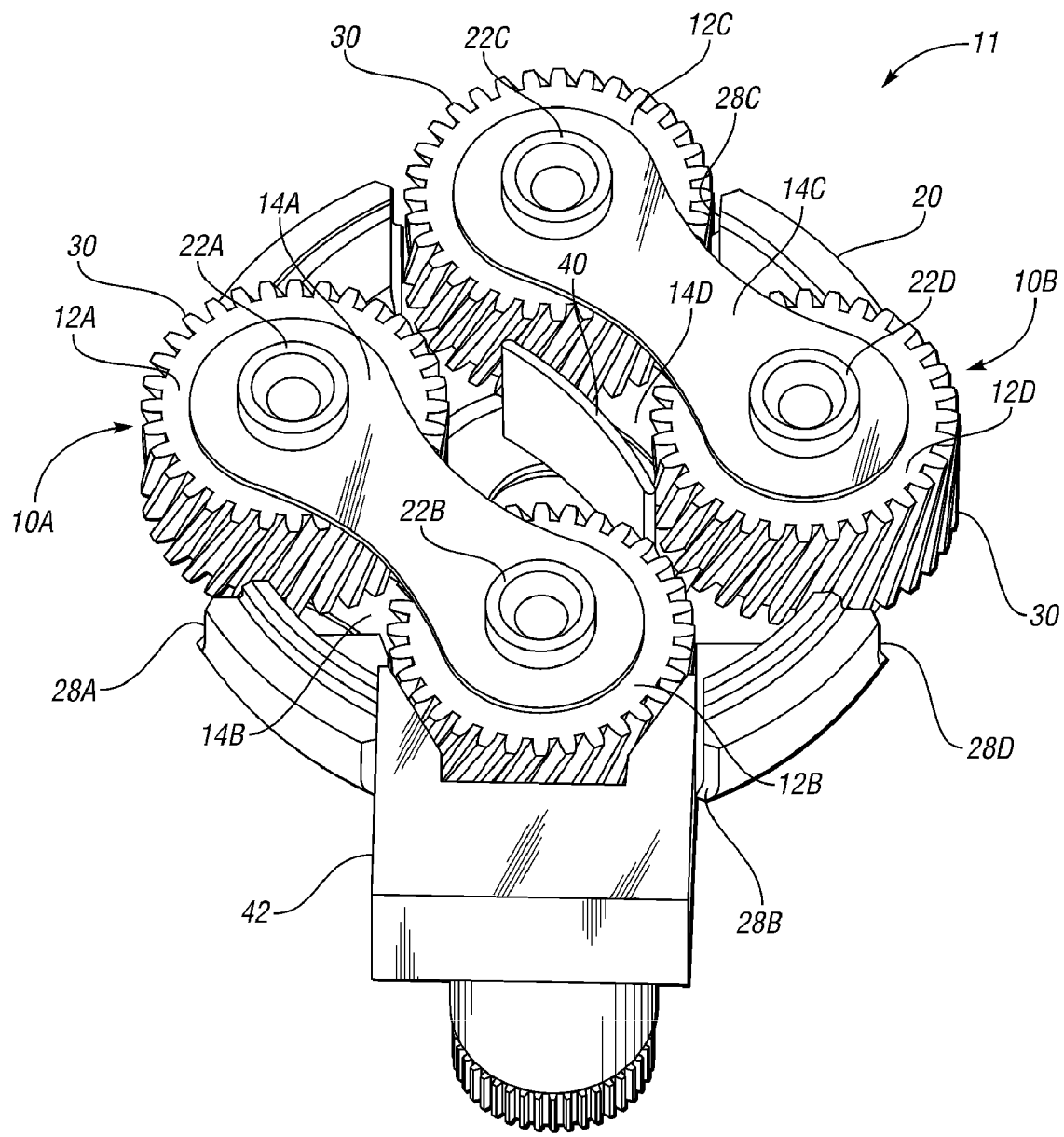
FIG. 5 is a schematic perspective view of the planet carrier assembly with the pinion subassembly stopped against the stop and secured to the carrier member with pins.

Referring to FIG. 5, as the pinion gear subassembly 10A is further inserted into the carrier member 20, the forward-most pinion gear 12B eventually encounters the stop 42, and insertion is terminated, the subassembly 10A having reached a final position within the carrier member 20. Specifically, when the pinion gear 12B contacts the stop 42, the plugs 18A, 18B, shown in FIG. 2, and associated openings of the washers 14A, 14B, 16A-16D and pinion gears 12A, 12B will be aligned with the pin openings 36A, 36B (shown in FIG. 2) of the carrier member 20.

Once the pinion gear subassembly 10A has reached the final position described above, the pins 22A, 22B are inserted through openings 48A, 48B (see FIG. 2) of the park gear 26, through the aligned openings of the stationary washers 14A, 14B and rotating washers 16A-16D as well as the axial openings through the pinion gears 12A, 12B. The pins 22A, 22B push the plugs 18A, 18B out of the subassembly 10A and secure the subassembly 10A to the carrier member 20 and the park gear 26, similar to pins 22C, 22D used to secure the subassembly 10B to the carrier member 20 and park gear 26, as shown in FIG. 4. In FIGS. 3-5, the subassembly 10B has been assembled to the carrier member 20 in a like manner as described with respect to subassembly 10B, using the guide member 40 and stop 42, with the guide member 40 positioned so that the curved surface 46 faces the opposite direction than shown in FIG. 3, and with the stop 42 positioned at circumferential opening 28D.

Figure 6:
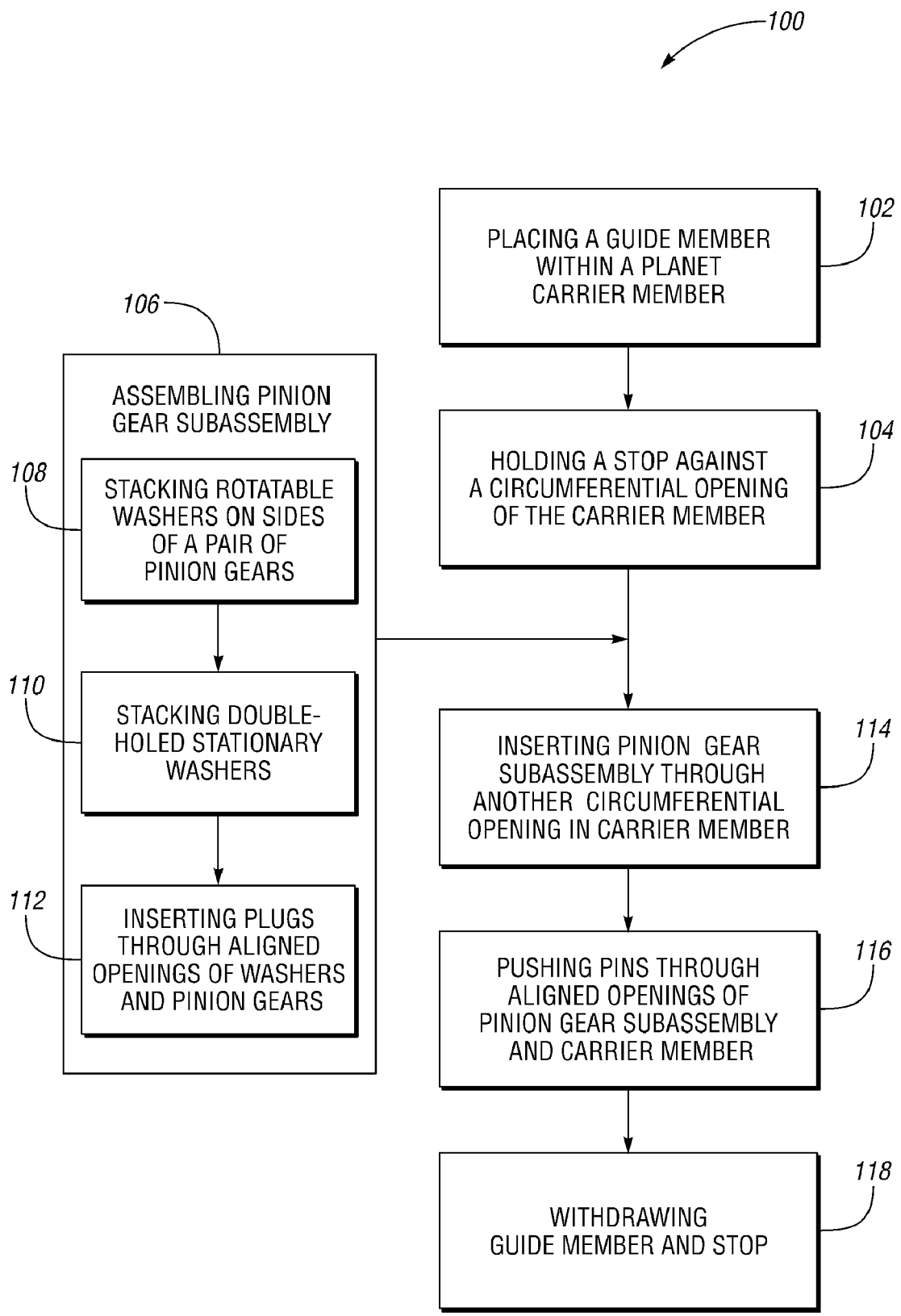
FIG. 6 is a flow diagram of a method of assembling a planet carrier assembly such as that of FIG. 5.

Referring to FIG. 6, a method 100 of assembling a planet carrier assembly is shown in block diagram form, and is described with respect to the planet carrier assembly 11 of FIGS. 2-5. The method 100 begins with block 102, placing a guide member 40 within a carrier member 20. The method 100 then proceeds to block 104, holding a stop 42 against a circumferential opening 28B of the carrier member 20.

Optionally, the method may include block 106, assembling a pinion gear subassembly 10A (and also pinion gear subassembly 10B) to be used in the carrier assembly 11. Alternatively, the subassemblies 10A, 10B may be obtained in a preassembled form, so that their assembly is not carried out under the method 100. Optional block 106 includes blocks 108, 110 and 112. In block 108, the rotatable washers 16A-16D are stacked on the respective sides 17A-17D of the pinion gears 12A, 12B. Next, in block 110, the double-holed stationary washers 14A, 14B are stacked against the rotatable washers as shown in FIG. 1. Finally, in block 112, plugs 18A, 18B are inserted through the aligned openings of the washers 14A-14B, 16A-16B and pinion gears 12A-12B to hold the components together as a subassembly 10A.

The pinion gear subassembly 10A is then inserted through circumferential opening 28A into the carrier member 20 in block 114. The previously positioned guide member 40 and stop 42 ensure that the pinion gear subassembly 10A is properly aligned with respect to predetermined locations (i.e., openings 36A, 36B) of the carrier member 20 at the completion of the insertion. In block 116, pins 22A, 22B are then pushed through the aligned openings of the pinion gear subassembly 10A and carrier member 20 (and in the embodiment shown, also through openings in park gear 26) to secure the subassembly 10A to the carrier member 20. Finally, in block 118, the guide member 40 and stop 42 may then be withdrawn from the carrier member 20. The method 100 is also performed in order to secure the pinion gear subassembly 10B to the carrier member 20.

While the best modes for carrying out the invention have been described in detail, those familiar with the art to which this invention relates will recognize various alternative designs and embodiments for practicing the invention within the scope of the appended claims.

The invention claimed is:

1. A pinion gear subassembly for a planet carrier assembly with a planet carrier member; wherein the planet carrier member is configured for rotatably supporting pinion gears at predetermined spaced locations thereon, comprising:

a first and a second pinion gear arranged with generally parallel axes of rotation;

a first and a second washer, each of the washers having two openings spaced to generally align with two of the predetermined spaced locations of the planet carrier member; wherein the first and the second washer are positioned on opposing sides of the first and second pinion gears, with the axes of rotation of the first and second pinion gears generally centered at the respective spaced openings of the first and second washers;

four rotatable washers each positioned between a respective one of the first and second washers and a respective one of the sides of a respective one of the pinion gears and rotatable relative to the planet carrier member; wherein each of the rotatable washers has an opening generally aligned with one of the openings of the respective one of the first and second washers; wherein the first and second washers are nonrotatable relative to the planet carrier member;

wherein the pinion gears have axial openings therethrough;

a first and a second plug each extending through a respective one of the axial openings, through the respective openings of a respective two of the rotatable washers, and through a respective one of the openings of each of the first and second washers to hold the pinion gear subassembly together as a unit separate from the planet carrier member;

wherein the planet carrier member has circumferential openings; and wherein the pinion gear subassembly held together as a unit by the plugs is configured to fit through the circumferential openings, with teeth of the first and the second pinion gears extending through the circumferential openings when the respective openings of the washers are aligned with the two of the predetermined spaced locations of the planet carrier member.

2. The pinion gear subassembly of claim 1 in combination with a guide member that is configured to rest against a surface of the planet carrier member that extends between the circumferential openings.

3. The pinion gear subassembly of claim 1 in combination with a stop member that is configured to span one of the circumferential openings.

4. The pinion gear assembly of claim 1 in combination with a guide member that is configured to rest against a surface of the planet carrier member that extends between the circumferential openings and a stop member that is configured to span one of the circumferential openings.

5. The pinion gear subassembly of claim 1 in combination with pins configured to extend through the pinion gear subassembly and the planet carrier member to secure the pinion gear subassembly within the planet carrier member.

6. An apparatus comprising:
a pinion gear subassembly having:
a first and a second pinion gear arranged with generally parallel axes of rotation;
a first and a second stationary washer each having two spaced openings; wherein the first and the second stationary washers are positioned on opposing sides of the first and second pinion gears with the axes of rotation of the first and second pinion gears generally centered at the respective spaced openings of the stationary washers and the stationary washers spanning between the first and the second pinion gears;
four rotatable washers each being at a respective different one of the spaced openings of the first and the second stationary washers;
a first and a second plug each inserted through a respective one of the pinion gears and through a respective opening in each of the stationary washers and two of the rotatable washers to hold the pinion gears and stationary and rotatable washers together as a unit;
a planet carrier member configured to define spaced circumferential openings and multiple additional openings; wherein the multiple additional openings are spaced to align with the two spaced openings in each of the stationary washers; and wherein the pinion gear subassembly with the first and second pinion gears, the first and second stationary washers, and the four rotatable washers is held together by the first and second plugs as a unit separate from the planet carrier member and is configured to fit through one of the circumferential openings in a direction generally perpendicular to the axes of rotation such that teeth of the first and the second pinion gears extend through the spaced circumferential openings with the two spaced openings of each of the stationary washers aligned with the additional openings of the planet carrier member and the rotatable washers rotatable relative to the planet carrier member.

7. The apparatus of claim 6 further comprising:
a guide member configured to rest against a surface of the carrier member through which the multiple additional openings extend;
a stop member configured to span another one of the circumferential openings; and
wherein the guide member is operable to guide the pinion gear subassembly when the pinion gear subassembly is fit through said one of the circumferential openings so that the pinion gear subassembly is stopped by the stop member when the two spaced openings of each of the stationary washers are aligned with the additional openings of the planet carrier member.

8. The apparatus of claim 6 further comprising a guide member that is configured to rest against a surface of the planet carrier member that extends between the circumferential openings.

9. The apparatus of claim 6 further comprising a stop member that is configured to span one of the circumferential openings.

10. The apparatus of claim 6 further comprising a guide member that is configured to rest against a surface of the planet carrier member that extends between the circumferential openings and a stop member that is configured to span one of the circumferential openings.

11. The apparatus of claim 6 further comprising pins configured to extend through the pinion gear subassembly and the planet carrier member to secure the pinion gear subassembly within the planet carrier member.

12. A pinion gear subassembly for a planet carrier member comprising:
first and second pinion gears with axial openings therethrough;
four rotatable washers positioned at respective opposing ends of each of the pinion gears and each having an opening therethrough;
first and second elongated stationary washers each having a pair of spaced openings and each positioned at opposing ends of the pinion gears with the rotatable washers between the stationary washers and the pinion gears;
a first plug configured to extend through the axial opening of the first pinion gear and the respective openings of the stationary washers and of the rotatable washers positioned at the opposing ends of the first pinion gear;
a second plug configured to extend through the axial opening of the second pinion gear and the respective openings of the stationary washers and of the rotatable washers positioned at the opposing ends of the second pinion gear; and
wherein the first and second plugs are configured to hold the pinion gears, the stationary washers and the rotatable washers together as a unit separate from the planet carrier member.

* * * * *